United States Patent [19]

Feldman, Jr.

[11] 4,217,882
[45] Aug. 19, 1980

[54] PASSIVE SOLAR HEAT COLLECTOR

[76] Inventor: Karl T. Feldman, Jr., 1704 Stanford Dr., NE., Albuquerque, N. Mex. 87106

[21] Appl. No.: 956,036

[22] Filed: Oct. 30, 1978

[51] Int. Cl.³ .................... F24J 3/02; F28D 15/00
[52] U.S. Cl. ..................... 126/433; 126/435; 126/438; 165/105
[58] Field of Search .............. 126/433, 435, 438; 165/105

[56] References Cited

U.S. PATENT DOCUMENTS

| | | | |
|---|---|---|---|
| 3,797,086 | 3/1974 | Asselman | 165/105 |
| 3,799,144 | 3/1974 | Ramsey et al. | 126/433 |
| 3,923,038 | 12/1975 | Cutchaw | 165/105 |
| 3,990,914 | 11/1976 | Weinstien | 165/105 |
| 4,057,963 | 11/1977 | Basiulis | 126/433 |
| 4,059,093 | 11/1977 | Knowles et al. | 126/433 |
| 4,067,315 | 1/1978 | Fehlner et al. | 126/433 |
| 4,080,957 | 3/1978 | Bennett | 165/105 |
| 4,119,085 | 10/1978 | Knowles et al. | 126/433 |
| 4,119,143 | 10/1978 | Robinson | 165/105 |
| 4,153,041 | 5/1979 | Grauleau | 165/105 |

FOREIGN PATENT DOCUMENTS 517755 6/1976 U.S.S.R. .................... 126/433

Primary Examiner—James C. Yeung
Assistant Examiner—Daniel O'Connor

[57] ABSTRACT

The present invention relates to a method and an improved passive apparatus for absorbing, transferring and storing solar energy as heat, economically and effectively, without pumps, solar tracking devices or electric power. The apparatus comprises an improved trough-type concentrating collector, a heat pipe heat absorber and an insulated storage tank. Solar energy is reflected and focused by the concentrator onto the absorber where the energy is absorbed as heat. The absorber, made of one or more slightly tilted gravity-assisted heat pipes partially filled with a volatile liquid, transfers the heat by evaporation, vapor transport and condensation into a slightly elevated heat storage reservoir. A method for filling the heat pipes is disclosed. The absorber serves as the main axial support for internal structural ribs over which are fitted a flexible transparent top cover and a flexible reflective bottom cover that comprise the concentrator. The apparatus collects solar energy, stores heat during the day and automatically shuts off to minimize heat losses at night. The apparatus may be refocused periodically to increase the temperature of the heat collected.

17 Claims, 7 Drawing Figures

PASSIVE SOLAR HEAT COLLECTOR

SUMMARY OF THE INVENTION

The present invention relates to a method and apparatus for absorbing, transferring and storing solar energy as heat.

The present invention is unique and different from the aforementioned solar collectors and any other known solar collectors, in that it has a modular constructed, passive non-tracking solar concentrator made of flexible reflective material and a passive heat pipe solar absorber. Thus there is no need for liquid pumps, air blowers, solar tracking systems, electric power, or extensive thermal insulation, and most important, the invention uses a simple design, that can be manufactured at low cost.

The primary object of this invention is to provide an apparatus for simple and effective passive solar heat collection and storage which can be manufactured at low cost. Another object is for the solar heat collection to be accomplished with high thermal conductance and fast time response. Another object of the invention is to provide a passive, concentrating solar collector that requires no tracking mechanisms or tracking controls, no temperature controls, no pumps, and no electric power. Another object of the invention is to provide a solar collector that may be used to heat a liquid such as water or to heat a vapor or gas such as air. Another object of the invention is to provide a procedure for filling the heat pipes in the solar heat absorber.

In its preferred embodiment, the passive solar energy heating apparatus has a cylindrical trough solar energy concentrator with a durable and flexible solar energy reflecting material on the bottom and a durable and flexible transparent cover over the top. The reflecting material and cover material are supported and given shape by internal structural ribs located along the length of the concentrator. Solar energy is reflected and focused by the concentrator into a linear region of small volume so as to increase the temperature in the linear region. The linear region of high temperature lies along the focal axis of the concentrator and it is in this region of focus that one end of the absorber is located. The absorber is made of one or more heat pipes, which may have longitudinal fins, placed in a geometric arrangement that intercepts the focused solar energy from the concentrator. The absorber is made of low cost metal or transparent tube(s) of sufficient strength to serve as the main axial structure on which the ribs of the concentrator are mounted.

The focused solar energy is absorbed as heat into the heat absorber section of the absorber. This heat absorber section becomes the evaporator of the heat pipes where the volatile liquid contained in the heat pipes is evaporated. The hot vapor flows to the other end of the heat pipes, which is slightly elevated above the evaporator end, where heat is removed and the hot vapor condensed. The liquid condensate then flows back to the evaporator with the aid of gravity forces. A capillary wick, such as circumferential screw threads or a porous material, may be provided on the inside wall of each heat pipe to provide circumferential wetting and enhance evaporation and condensation. The gravity assisted heat pipes in the absorber provide one-directional heat transfer to transfer heat up into the storage reservoir during the day but do not transfer heat out of storage at night or during cloudy weather.

A heat storage reservoir, containing a heat absorbing fluid, such as water, is connected to the elevated condenser end of the heat pipe(s) to absorb and store the heat. The heat storage reservoir is provided with inlet and outlet passages so that the heated fluid may be drawn off and cool make up fluid can flow in. Also, the heat storage reservoir is provided with external thermal insulation to minimize heat loss to the surroundings.

A support structure is attached to the linear heat absorber and to the heat storage reservoir to support the structure on whatever base it may be placed, such as a roof top or on the ground. The support structure is provided with slip joints between the support structure and the collector so that the entire collector may be rotated about its linear focal axis to focus the solar energy onto the linear heat absorber. An alternative arrangement is to provide the concentrator with slip joints so that only the concentrator rotates while the absorber and storage tank remain fixed.

Normally the axis of the collector would be oriented in an east-west direction and would not need to track the sun. The concentrator and absorber are designed to remain in focus for a large variation in the angle of incidence of the solar energy rays. Thus the collector may be focused initially and then remain in focus for many weeks. More frequent refocusing would tend to produce a sharper focus onto the absorber and thus produce slightly higher temperature on the absorber.

Various shapes of concentrators may be used including cylindrical, parabolic, or a Trombe cusp type. The shape of the concentrator is determined by the shape of the structural ribs over which the reflector material and the cover material are stretched and attached. The ribs are attached periodically at right angles to the absorber. The ribs are made from a low-cost, easily fabricated material, such as wood, and may be painted a light color or coated with a reflective material to preserve the rib material and to reflect sunlight. The internal ribs have a large part of their internal area cut away to provide an open structure that causes minimal obstruction of the solar energy rays.

The geometric arrangement of the one or more heat pipes in the absorber may be selected to suit the application. A single absorber heat pipe may be used with a sharp focusing concentrator such as the parabolic concentrator or cusp concentrator to achieve higher temperatures but more frequent refocusing of the concentrator is needed. A linear heat absorber of at least two heat pipes in a planar geometry, of at least three heat pipes in a V geometry, or of at least three heat pipes in a Y geometry, may be used with the cylindrical or cusp concentrator when moderate temperatures and less frequent refocusing are suitable. A selective surface coating may be used on the absorber to achieve higher absorptivity and lower emissivity to reduce heat losses. Also, a second longitudinal transparent cover that can be sealed and evacuated of air and other gases may be used over the linear heat absorber to further minimize heat losses. The one or more heat pipes used in the absorber may be separate cylindrical pipes or they may be provided with fins and be connected or formed from a single metal section such as a metal extrusion with tubes formed in it.

A simple and effective focusing apparatus consisting of a small plate having a small pinhole is attached on the top and the center of each end of the concentrator, so that a small spot of sunlight falls directly on the absorber pipe when the concentrator is properly aligned and focused.

The heat absorbing fluid contained in the heat storage reservoir may be air or some other gas. By providing fins on the condenser end of the heat pipe absorber, the air may be heated effectively and drawn off for external use.

The invention, both as to its organization and method of operation, together with further objects and advantages thereof, will best be understood by reference to the following specifications taken in connection with the accompanying drawings, in which.

Figure 1:
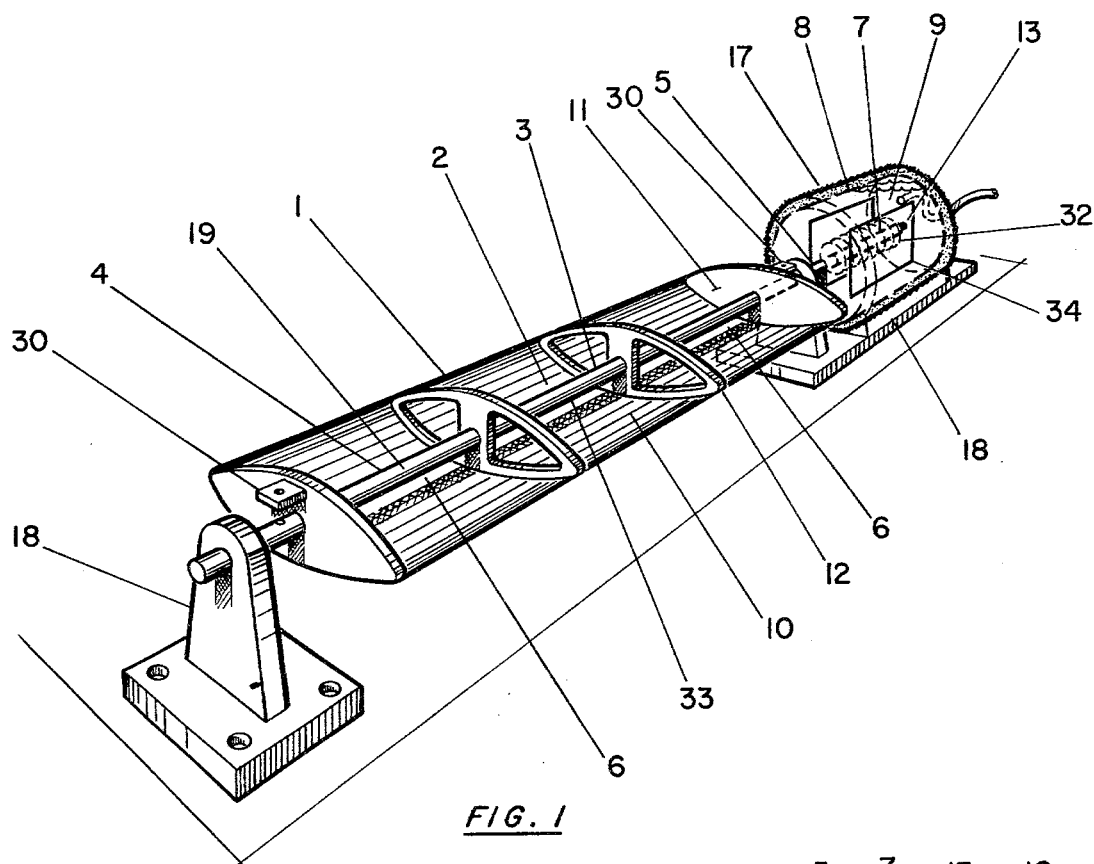
FIG. 1 is an isometric view of the passive solar heating apparatus.
Figure 2:
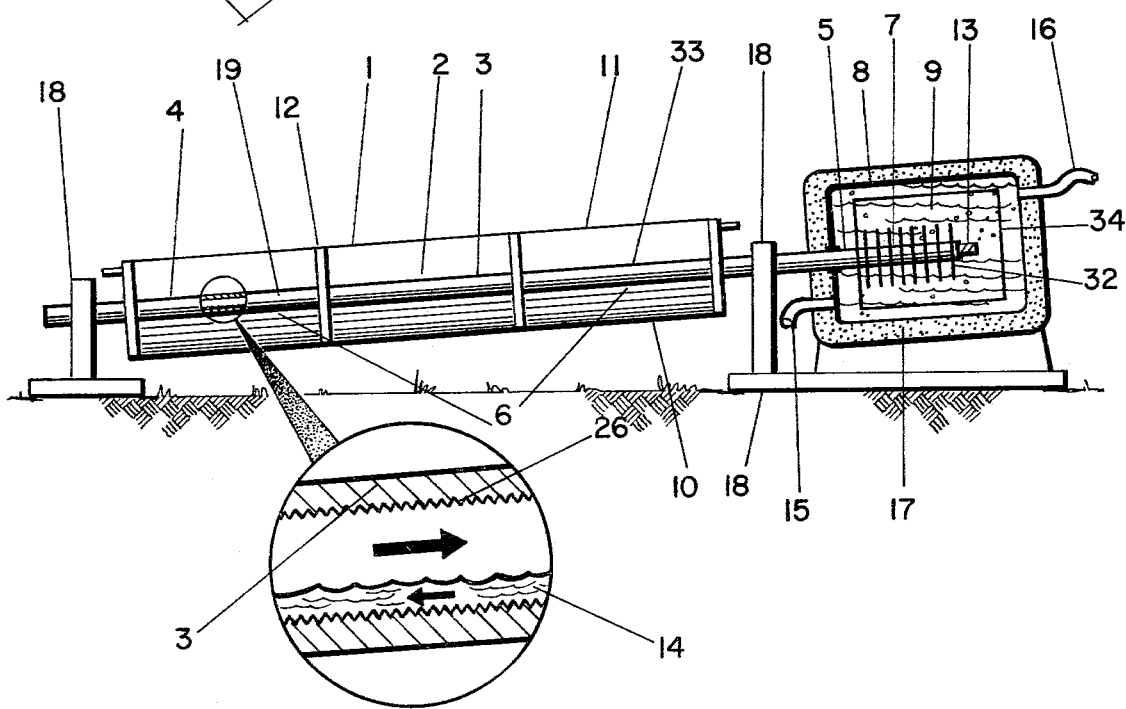
FIG. 2 is a cross-section view of the passive solar heating apparatus.

Referring now to the drawings and particularly to FIGS. 1 and 2 thereof, where the passive solar heating apparatus is there illustrated with a solar energy concentrator 1 structured to reflect and focus solar energy into a linear region of small volume 2 where the temperature is increased. A linear heat absorber 3 having a first end 4 and a second end 5 is located in this high temperature region of small volume 2 to absorb the focused solar energy as heat. The heat absorber is composed of at least one heat pipe 33 which absorbs the heat along the first end 4 of the absorber 3 in a section known as the heat absorber section 6. Heat is transferred by the heat pipe(s) 33 to the second end 5 of the absorber where the heat is removed in a heat removal section 7. The heat is then transferred to and stored in a heat absorbing fluid 9 contained in a heat storage reservoir 8 fitted over the second ends of the absorber 3.

The concentrator 1 is an improved design consisting of a durable and flexible solar energy reflecting material 10 along the bottom surface to reflect and focus the solar energy onto the absorber 3, and a durable and flexible transparent material 11 along the top surface to help minimize heat losses. A series of structural ribs 12 are spaced along the length of the concentrator to support and give shape to the flexible solar energy reflecting material 10 and the flexible transparent material 11. The ribs are supported on the absorber 3 which provides the main axial support structure for the concentrator 1.

The one or more heat pipe(s) 33 in the absorber 3 have the first end closed and the second end provided with a closure means 13, such as a valve or a pinch off closure. The heat pipe(s) 33 are made of material capable of serving as the main axial support structure for the concentrator 1 and capable of serving as a hermetically sealed vessel containing a volatile liquid 14 that serves as the heat pipe liquid. The volatile liquid 14 is evaporated in the heat absorber section 6 of the heat pipe(s) 33 and condensed in the heat removal section 7. The heat absorber 3 composed of one or more heat pipes 33, is tilted slightly with the heat removal section 7 above the heat absorber section 6 so that the condensed liquid 14 will flow from the heat removal section 7 to the heat absorber section 6 by gravity forces. This type of gravity assisted heat pipe 33 achieves a desirable one-directional heat transfer effect in that heat is transferred effectively upward into the storage reservoir 8 during the day but at night all the liquid runs to the lower end 4 and the heat pipe ceases to transfer heat and thus does not remove heat from the storage reservoir 8. The heat pipe(s) 33 may be provided with internal circumferential screw threads 26 or other porous material line the inside wall to serve as a circumferential capillary wick to allow the volatile liquid to wet the internal surface for enhanced evaporation and condensation. The heat pipe(s) 33 may also be made of a transparent material with a dark colored porous wick that allows solar energy to be absorbed directly into the liquid saturated wick where it heats and evaporates liquid.

The heat storage reservoir 8 containing a heat absorbing fluid 9, such as water, is provided with an inlet passage 15 for cool make up fluid to flow in and an outlet passage 16 for the heated fluid 9 to be drawn off for external use. Also the heat storage reservoir 8 is provided with external thermal insulation 17 to minimize heat losses to the surroundings. The heat storage reservoir 8 may be provided with baffles 34, shown in FIG. 1, to cause the natural convection of the heat absorbing fluid 9 to mix the fluid and help prevent stratification. The heat absorbing fluid 9 may also be a gas 31, such as air, and in this case external fins 32 should be provided on the heat removal section 7 of the absorber 3.

A support structure 18 is attached to the absorber 3 and to heat storage reservoir 8 to support the apparatus on a roof, on the ground, or on whatever base it may be placed. The support structure 18 allows the concentrator 1 to be oriented to properly receive the solar energy and to allow the entire apparatus to be rotated about the linear focal axis so that the concentrator 1 can focus the solar energy onto the absorber 3.

In order to minimize heat losses the absorber 3 may be coated on its outside surface with a selective surface coating 19 that gives high absorptivity and low emissivity of solar energy.

Figure 3:
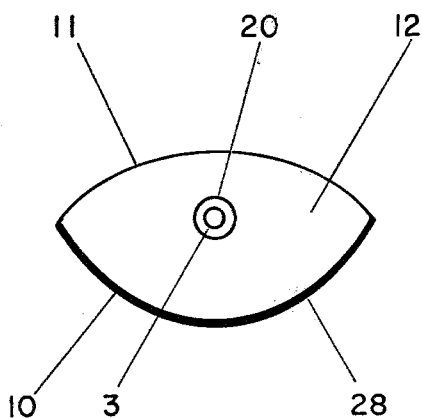
FIG. 3 is a cross-section view of the parabolic concentrator with a single absorber heat pipe in the region of focus and a secondary evacuated cover around the absorber.

As is shown in cross-section in FIG. 3, the absorber 3 may be enclosed in a longitudinal transparent cover 20 that may be sealed at both ends and evacuated of air and other gases to further minimize heat losses and increase heat collection temperatures. Also shown in FIG. 3 in cross-section is the concentrator 1 in a parabolic trough 28 shape. The ribs 12 have a parabolic shape on the bottom and the bottom is covered with solar energy reflecting material 10 while the top is covered with transparent material 11.

Figure 4:
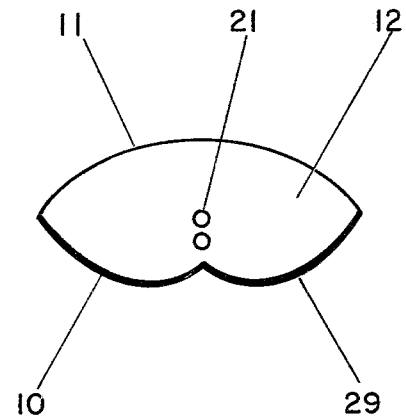
FIG. 4 is a cross-section view of a Trombe cusp concentrator with an absorber of at least two heat pipes in the region of focus.
Figure 7:
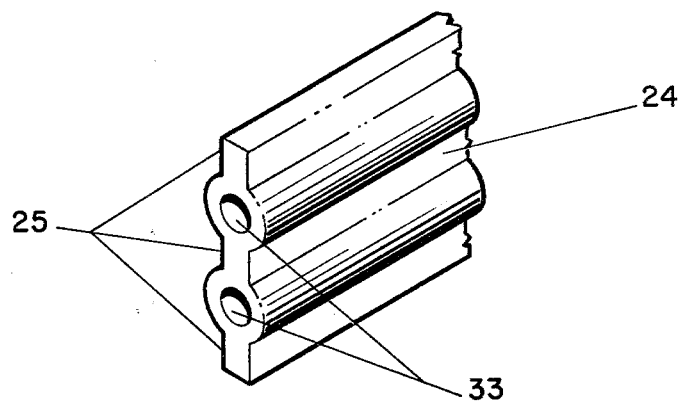
FIG. 7 is an isometric view of a section of the absorber with two finned heat pipes made of extruded metal.

In order to provide a larger acceptance angle for the collection of solar energy and therefore less frequent refocusing, the shape of the concentrator 1 and the size of the absorber 3 may be changed. As is shown in FIG. 4 the ribs 12 and reflecting material 10 are formed into the shape of a Trombe cusp 29 to give a larger solar acceptance angle for the concentrator 1. The absorber 3, shown in FIG. 4, as a planar absorber 21, is composed of at least two heat pipes 33 arranged in a planar geometry to intercept the solar energy reflected from the concentrator 1. These heat pipes 33 may be separate pipes or they may be joined with fins 25 such as is shown in FIG. 7.

Figure 5:
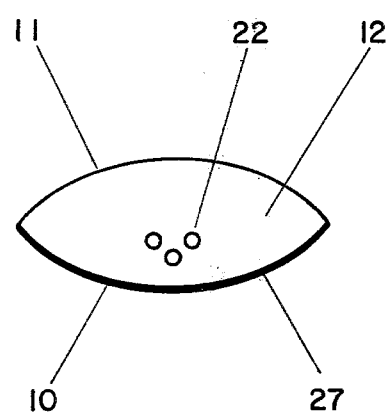
FIG. 5 is a cross-section view of a cylindrical concentrator with an absorber of at least three heat pipes arranged in a V shaped geometry in the region of focus.
Figure 6:
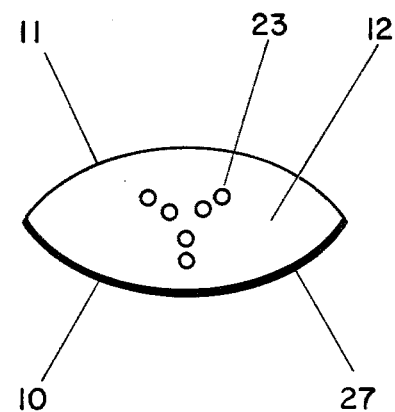
FIG. 6 is a cross-section view of a cylindrical concentrator with an absorber with five heat pipes arranged in a Y shaped geometry in the region of focus.

A large acceptance angle may also be achieved by a concentrator 1 in a cylindrical trough 27 shape as is shown in FIGS. 5 and 6. The ribs 12 are of cylindrical shape and the reflecting material 10 is formed over it. The absorber 3 is shown in FIG. 5 as a "V" shaped absorber 22 composed of at least three heat pipes 33 arranged in a V shaped geometry to intercept the solar energy reflected from the concentration 1. A large acceptance angle may also be achieved with an absorber 3, in a "Y" shaped absorber 23, composed of at least three heat pipes 33 arranged in a Y shaped geometry to intercept the solar energy reflected from the concentrator 1. In FIG. 6 the Y shaped absorber is shown with five heat pipes arranged in a Y shaped geometry.

The different absorber 3 configurations—single heat pipe absorber, planar absorber 21, V shaped absorber 22, and Y shaped absorber 23 may be used with any of the different concentrator 1 configurations—parabolic trough 28, Trombe cusp 29, and cylindrical trough 27. The different absorbers may be made of separate heat pipes 33 or of heat pipes with fins 25. The absorber 3 composed of one or more heat pipes with or without fins 25 may be made of extruded metal 24, such as is shown in FIG. 7.

The concentrator 1 may be refocused periodically by either rotating the entire apparatus around its focal axis or by rotating only the concentrator 1 while the absorber 3 and heat storage reservoir 8 remain fixed. In the latter case, a slip joint will be provided between the ribs 12 of the concentrator 1 and the absorber 3.

The focusing and alignment of the apparatus may be accomplished by providing a small plate 30, having a small pinhole, at the top edge and in the center of each of the two end ribs of the concentrator as shown in FIGS. 1 and 2. The proper east-west position of the entire apparatus and the proper angle of orientation of the concentrator 1 toward the sun can be determined when the sun's rays passing through the pin holes in the two plates 30 fall directly on the top of the absorber 3.

A convenient method for filling the heat pipes 33 in the absorber 3 consists of first cleaning the heat pipes 33 inside, filling the heat pipes 33 partially full of the volatile liquid 14, and then heating the heat absorber section 6 of the heat pipes 33 so that the volatile liquid is heated to a temperature above its normal boiling point. The heating may be done by simply aligning and focusing the concentrator 1 so that the focused solar energy is used to heat the absorber 3. Then the closure means 13 on the second end 5 of the heat pipes 33 is opened slightly and any air, other non-condensing gases, and excess volatile liquid 14 is vented. Then the closure means 13 is closed and sealed.

The invention has now been described in considerable detail. However, it is obvious that others skilled in the art can build and devise alternate and equivalent constructions which are nevertheless within the spirit and scope of this invention. It is the intention of the appended claims to cover all such alternate and equivalent constructions.

I claim:

1. An improved passive solar heating apparatus of the type having a solar energy concentrator structured to reflect and focus solar energy into a linear region of small volume so as to increase the temperature in the linear region, having a linear heat absorber of at least one heat pipe, with a first and second end with the first end serving as a heat absorber section located in the high temperature linear region of the concentrator to absorb the focused solar energy as heat and transfer it into the second end that serves as a heat removal section, wherein the improvement comprises:

a. a concentrator made of a durable and flexible solar energy reflecting material along the bottom surface to reflect and focus the solar energy into the linear region of small volume, a durable and flexible transparent material along the top surface to help minimize heat losses, and internal structural ribs located along the concentrator to support and give shape to the flexible solar energy reflecting material and the flexible transparent material;

b. a linear heat absorber of at least one heat pipe having the first end closed and the second end provided with a closure means and being made of material capable of serving as the main axial support structure for the concentrator and capable of serving as a hermetically sealed vessel containing a volatile liquid that transfers heat by evaporation in the heat absorber section and condensation in the heat removal section, said absorber being tilted with the heat removal section above the heat absorber section so that condensed liquid will flow from the heat removal section to the heat absorber section by gravity force and thereby provide heat transfer into the heat removal section but not out of it;

c. a heat sorage reservoir containing a heat absorbing fluid is connected to the heat removal section of the absorber c. to absorb and store heat, and is provided with inlet and outlet passages for the heated fluid to be drawn off for external use and cool makeup fluid to flow in and is provided with external thermal insulation to minimize heat loss to the surroundings; and d. a support structure attached to the absorber and to the heat storage reservoir adapted to support the apparatus on whatever base it may be placed in a proper orientation to receive the solar energy and to allow the apparatus to be rotated about the linear focal axis so that the concentrator can focus the solar energy onto the absorber.

2. The apparatus recited in claim 1 wherein the absorber comprises:

a. a selective surface coating on the outside surface of the absorber that gives high absorptivity and low emissivity of solar energy; and b. a longitudinal transparent cover around the linear heat absorber that may be sealed at both ends and evacuated of air and other gases to further minimize heat losses.

3. The apparatus recited in claim 1 wherein the absorber comprises at least two heat pipes arranged in a planar geometry along the high temperature linear region of the concentrator to intercept the solar energy reflected from the concentrator.

4. The apparatus recited in claim 1 wherein the absorber comprises at least three heat pipes arranged in a V shaped geometry along the high temperature linear region of the concentrator to intercept the solar energy reflected from the concentrator.

5. The apparatus recited in claim 1 wherein the absorber comprises at least three heat pipes arranged in a Y shaped geometry along the high temperature linear region of the concentrator to intercept the solar energy reflected from the concentrator.

6. The apparatus recited in claim 1 wherein the absorber is made of at least one section of extruded metal with at least one hollow heat pipe formed within it.

7. The apparatus recited in claim 1 wherein the absorber of at least one hollow heat pipe is provided with at least one longitudinal fin securely attached and extending radially out from the pipe to provide additional surface to intercept the solar energy reflected from the collector.

8. The apparatus recited in claim 1 wherein the absorber of at least one hollow heat pipe is provided with internal circumferential screw threads or other porous material lining the inside wall to serve as a circumferential capillary wick to allow the volatile liquid to wet the internal surface for enhanced evaporation and condensation.

9. The apparatus recited in claim 1 wherein the absorber of at least one hollow pipe is made of a transparent pipe material and a dark colored porous wick that allows solar energy to be absorbed directly into the liquid saturated wick.

10. A method for filling the absorber of at least one heat pipe recited in claim 1 wherein:
   a. cleaning the absorber;
   b. filling the absorber partially full of the volatile liquid;
   c. heating the absorber along the heat absorption section so that the volatile liquid is heated to a temperature above its normal boiling point;
   d. venting the air, other non-condensing gases, and excess volatile liquid from the absorber by opening slightly the closure means on the second end; and
   e. closing and sealing the closure means.

11. The apparatus recited in claim 1 wherein the solar energy concentrator comprises:
   a. a longitudinal cylindrical trough along the bottom;
   b. internal structural support ribs of cylindrical shape along the bottom to give shape to the flexible solar energy reflecting material attached along the bottom, the ribs being made of a low cost, easily fabricated material and coated with a protective coating to provide long lifetime and to reflect sunlight, the internal ribs having an open structure to provide minimal obstruction of the solar energy rays, and the ribs being attached to the absorber.

12. The apparatus recited in claim 1 wherein the solar energy concentrator comprises:
   a. a longitudinal parabolic trough along the bottom;
   b. internal structural support ribs of parabolic shape along the bottom to give shape to the flexible solar energy reflecting material attached along the bottom, the ribs being made from a low cost, easily fabricated material and coated with a protective coating to provide long lifetime and to reflect sunlight, the internal ribs having an open structure to provide minimal obstruction of the solar energy rays, and the ribs being attached to the absorber.

13. The apparatus recited in claim 1 wherein the solar energy concentrator comprises:
   a. a longitudinal Trombe cusp trough along the bottom;
   b. internal structural support ribs of the Trombe cusp shape along the bottom to give shape to the flexible solar energy reflecting material attached along the bottom, the ribs being made of low cost, easily fabricated material and coated with a protective coating to provide long lifetime and to reflect sunlight, the internal ribs having an open structure to provide minimal obstruction of the solar energy rays, and the ribs being attached to the absorber.

14. The apparatus recited in claim 1 wherein the solar energy concentrator may be rotated around the absorber so that the concentrator can focus the solar energy onto the linear heat absorber.

15. The apparatus recited in claims 1 wherein a plate having a small pinhole is located on the top edge and in the center of each of the two end ribs of the concentrator so that a small spot of sunlight falls directly on the absorber when the concentrator is properly aligned and focused.

16. The apparatus recited in claim 1 wherein the heat storage reservoir contains baffels comprised of two plates located on either side of the absorber to induce natural convection mixing of the heat absorbing fluid.

17. The apparatus recited in claim 1 wherein:
   a. the heat absorbing fluid contained in the heat storage reservoir is a gas that flows over the heat removal section of the absorber to remove and transfer heat; and
   b. the absorber is provided with external fins in the heat removal section to enhance convective heat transfer from the absorber to the gas.

* * * * *